United States Patent [19]

Mone et al.

[11] Patent Number: 5,298,190

[45] Date of Patent: Mar. 29, 1994

[54] PHOTOCHROMIC FLUORESCENT COMPOSITIONS

[75] Inventors: John G. Mone, Crockett; Thomas C. Molloy, San Pablo, both of Calif.

[73] Assignee: Magruder Color Company, Elizabeth, N.J.

[21] Appl. No.: 944,512

[22] Filed: Sep. 14, 1992

[51] Int. Cl.$^5$ .............................................. C09K 11/06
[52] U.S. Cl. .......................... 252/301.26; 252/301.16; 252/301.25; 252/301.31
[58] Field of Search .................... 252/301.16, 301.25, 252/301.26, 301.31; 430/345, 139; 106/21 A, 23 B

[56] References Cited

U.S. PATENT DOCUMENTS

| | | | |
|---|---|---|---|
| 3,230,178 | 1/1966 | Bennahmias | 252/301.35 |
| 3,682,854 | 8/1972 | Bennahmias et al. | 524/597 |
| 3,796,668 | 3/1974 | Hickcox | 252/301.35 |
| 3,922,232 | 11/1975 | Schein | 252/301.35 |
| 4,079,026 | 3/1978 | Mone | 524/513 |

FOREIGN PATENT DOCUMENTS

| | | |
|---|---|---|
| 134610 | 7/1946 | Australia ...................... 252/301.2 R |
| 327788 | 8/1989 | European Pat. Off. . |
| 0331217 | 9/1989 | European Pat. Off. . |
| 3622871 | 2/1987 | Fed. Rep. of Germany . |
| 90282242 | 11/1990 | Japan . |
| 1186987 | 8/1968 | United Kingdom ......... 252/301.2 R |
| 2214191A | 1/1988 | United Kingdom . |

OTHER PUBLICATIONS

*Printwear*, "The Heat Is On!", Aug., 1991, pp. 30–38.

Primary Examiner—Prince Willis, Jr.
Assistant Examiner—Edna Wong
Attorney, Agent, or Firm—Connolly and Hutz

[57] ABSTRACT

A composition containing a photochromic material and a fluorescent pigment provides a duality of color in products where the composition is used as the coloring agent. Under ordinary lighting conditions, the composition will provide a brilliant, glowing color and under excitation illumination such a ultraviolet radiation, a different brilliant glowing color results.

6 Claims, No Drawings

PHOTOCHROMIC FLUORESCENT COMPOSITIONS

The present invention relates to compositions which have a glowing fluorescent color under ordinary conditions and a second different glowing fluorescent color when excited by electromagnetic radiation of a specific energy level.

BACKGROUND OF THE INVENTION

It has long been recognized that certain chemical compounds will absorb light energy (electromagnetic radiation) at particular frequencies and remit this absorbed energy at lower frequencies. Natural materials such as quinine and various minerals will absorb ultraviolet (UV) light and remit that energy as visible spectrum light, i.e., they fluoresce. The theory of fluorescence is discussed in *Kirk-Othmer Encyclopedia of Chemical Technology*, Second Edition, Volume 9, pages 485-491 (1966). Fluorescence is not limited to UV absorption and remission. So-called daylight fluorescent pigments will fluoresce when excited by radiation in both the UV and visible spectrum ranges. In those pigments the emitted fluorescence combines additively with the normal reflected color to the extent that these pigments appear to glow in normal daylight.

Chemical compounds which exhibit photochromism are also known. Photochromism is also a phenomenon which is well known and thoroughly documented. It is a reversible phenomenon in which exposure of certain compounds to electromagnetic radiation of a particular wavelength will cause a color change. When the radiation is removed, the original color will reappear. Although many photochromic compounds have been synthesized, most do not have a strong exhibition of color when in the non-excited state. This lack of color absent excitation energy has inhibited widespread use of photochromic compounds in commerce.

BRIEF DESCRIPTION OF THE INVENTION

It has been discovered that one brilliant, glowing color can be replaced by another brilliant, glowing color under the influence of exciting electromagnetic radiation when the coloring agent is a composition containing both a fluorescent pigment and a photochromic compound.

DETAILED DESCRIPTION

This invention relates to a composition which enables articles to be endowed with one brilliant, glowing color under ordinary ambient conditions and when that article is subjected to electromagnetic radiation of a specific energy level, it will display another brilliant, glowing color. That composition comprises a fluorescent pigment dispersed in a plasticizer and liquid solution of a photochromic material dissolved in an organic solvent. The photochromic material is either a 1,3,3-trimethylindolinobenzospiropyran compound of the formula (I) or a 1,3,3-trimethylspiroindolinonaphthoxazine compound of the formula (II) wherein for each of (I) and (II), R is alkyl having 1 to 12 carbon atoms.

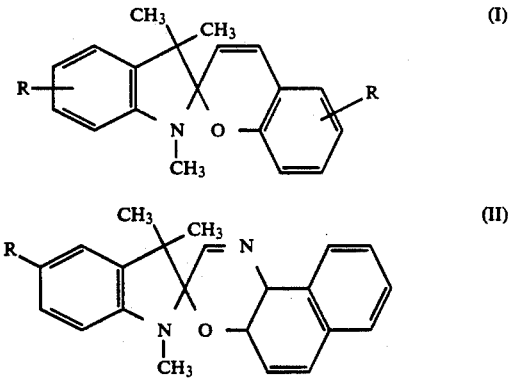

The photochromic compounds (I) or (II) are dissolved in an organic solvent such as diisononyl phthalate (DINP). The preferred solvent is a phthalate plasticizer in the liquid state. That solution is then blended with a dispersion of a fluorescent pigment. A variety of dispersions are known to those skilled in the art but the preferred dispersion for this invention is a fluorescent pigment dispersed in a phthalate plasticizer. In particular, diisononyl phthalate plasticizer is the most preferred dispersing medium.

The amounts of photochromic compound and fluorescent pigment used will determine the intensity of the color and fluorescence, respectively. Typically, the concentration of the photochromic compound in the solution is from 0.05 to 5% and the amount of fluorescent pigment in the dispersion is from 10 to 50%. The ratio of amounts of photochromic compound to fluorescent pigment will depend on the effect sought to be achieved but in general the ratio is from 1:200 to 1:10.

Compositions according to the present invention can be used to impart duality of color to a wide variety of products. The compositions can be incorporated into inks such as clear plastisol screen inks, into coating, into films and, indeed, into any material where a pigment is used as the coloring agent.

The following examples will serve to further illustrate specific embodiments of the present invention but are not intended to be limiting thereon. The following examples offer methods of preparation for the first stage product in a two-stage process of creating a final fluorescent/photochromic product. The examples yield a concentrated color dispersion which requires further modification before commercial use can occur.

This modification consists of utilizing a dispersion technique whereby the first-stage concentrate (specified in the respective examples) is dispersed into plastisol at a ratio of 20:80 fluorescent/photochromic concentrate: plastisol. This is performed by stirring the plastisol in an unheated mixing vessel and adding the fluorescent/photochromic dispersion until a uniform final dispersion is achieved.

The procedure comprises the following steps:
1. Adding diisonyl phthalate (DINP) to heatable mixing kettle.
2. Begin stirring, heat DINP to a temperature from about 200° F. to about 400° F. and, preferably to a temperature of about 350° F.
3. While stirring add photochromic compound.
4. While maintaining batch temperatures, stir for at least 2 minutes and preferably at least ten minutes (until dissolved).

5. Pour into cool mixing kettle.
6. When mixture drops to a temperature from about 350° F. to about 90° F., preferably the temperature is about 90° F., add fluorescent pigment while stirring until well dispersed.
7. When properly dispersed, the material is ready to be packaged. Additionally, a step (4a) of adding Precipitated Silica can be preformed after step 4 and stirring until well dispersed usually from about 2 min to about 40 min, and more preferably about 10 to about 15 minutes.

EXAMPLE 1

| INGREDIENT | % |
|---|---|
| Diisononyl phthalate | 58.01 |
| Photochromic compound | 0.52 |
| Fluorescent pigment | 41.47 |
| | 100.00 |

Procedure

1. Add diisonyl phthalate (DINP) to heatable mixing kettle.
2. Begin stirring, heat DINP to 350° F.
3. While stirring at 350° F., add photochromic compound.
4. While maintaining batch temperature, stir for ten minutes (until dissolved).
5. Pour into cool mixing kettle.
6. When mixture drops to 90° F., add fluorescent pigment while stirring until well dispersed.
7. When properly dispersed, the material is ready to be packaged.

EXAMPLE 2

| INGREDIENTS | % |
|---|---|
| Diisononyl phthalate (DINP) | 60.70 |
| Photochromic Compound | 0.50 |
| Precipitated Silica | 3.80 |
| Fluorescent pigment | 35.00 |
| | 100.00 |

Procedure

1. Add DINP to heatable mixing vessel.
2. Begin stirring, heat to 350° F.
3. At 350° F., add photochromic compound while continuing to stir.
4. Maintain stirring and hold temperature at 350° F. for ten minutes.
5. Add Precipitated Silica and stir until well dispersed (10–15 minutes).
6. Pour into unheated mixing vessel and allow to cool to 90° F.
7. At 90° F., add Fluorescent pigment and stir until well dispersed.
8. When properly dispersed, the material is ready for packaging.

EXAMPLE 3

| INGREDIENTS | % |
|---|---|
| Diisononyl phthalate (DINP) | 46.42 |
| Photochromic Compound | 0.50 |
| Precipitated Silica | 3.57 |
| Polyterperpene Resin | 9.52 |
| Fluorescent Pigment | 39.99 |
| | 100.00 |

Procedure

1. Add DINP and polyterpene resin to heatable mixing vessel.
2. Begin stirring, heat to 350° F.
3. At 350° F., add photochromic compound while continuing to stir.
4. Maintain stirring and hold temperature at 350° F. for ten minutes.
5. Add Precipitated Silica and stir until well dispersed (10–15 minutes).
6. Pour into unheated mixing vessel and allow to cool to 90° F.
7. When cool, stir in fluorescent pigment until well dispersed.

EXAMPLE 4

| INGREDIENTS | % |
|---|---|
| Toluene sulfonamide | 48.72 |
| Paraformaldehyde prills | 16.92 |
| Melamine | 12.56 |
| Oxalic Acid | 0.08 |
| Fluorescent Dye | 0.98 |
| Benzoate Plasticizer | 19.76 |
| Photochromic Compound | 0.98 |
| | 100.00 |

Procedure

1. Add Plasticizer to heatable mixing vessel.
2. Begin stirring, heat until melted.
3. When molten, add photochromic compound while continuing to stir until dissolved.
4. Let mixture cool to solidification.
5. Add remaining ingredients to vessel and reapply heat and begin mixing.
6. Maintain stirring and bring temperature at 320° F.
7. At 320° F., material is ready to be poured into trays for cooling and solidification.
8. The resulting product can be ground for use in dispersion.

What is claimed is:

1. A coloring composition comprising, dispersed in combination in a plasticizer, a fluorescent pigment and a photochromic compound of the formula (I) or (II) or a mixture thereof

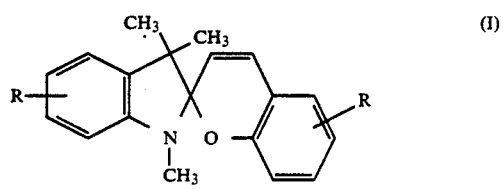

-continued

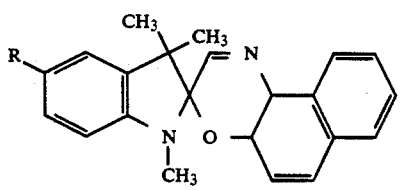
(II)

wherein R in each formula represents an alkyl or 1 to 12 carbon atoms, and wherein the ratio of photochromic compound to fluorescent pigment in the composition is between 1:200 to 1:10.

2. The composition of claim 1 wherein the plasticizer is a phthalate or benzoate plasticizer.

3. The composition of claim 2 wherein the phthalate plasticizer is diisononyl phthalate.

4. The composition of claim 1 wherein the photochromic compound is one or both of 1,3,3,3- trimethylindolinobenzospiropyran or 1,3,3-trimethylspiroindolinonaphthoxazine.

5. A process of preparing the coloring composition as claimed in claim 1, comprising dispersing the photochromic compound in heated plasticizer, and thereafter dispersing the fluorescent pigment therein.

6. The process of claim 5, wherein the plasticizer is heated to a temperature of 200 to 400 degrees F.

* * * * *